US008319921B2

(12) United States Patent
Saitoh et al.

(10) Patent No.: US 8,319,921 B2
(45) Date of Patent: Nov. 27, 2012

(54) LIQUID CRYSTAL DISPLAY DEVICE

(75) Inventors: Masaaki Saitoh, Osaka (JP); Kazuyoshi Fujioka, Osaka (JP); Katsuya Ogawa, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 184 days.

(21) Appl. No.: 12/935,127

(22) PCT Filed: Feb. 19, 2009

(86) PCT No.: PCT/JP2009/052919
§ 371 (c)(1),
(2), (4) Date: Sep. 28, 2010

(87) PCT Pub. No.: WO2009/139207
PCT Pub. Date: Nov. 19, 2009

(65) Prior Publication Data
US 2011/0019113 A1  Jan. 27, 2011

(30) Foreign Application Priority Data

May 12, 2008 (JP) .................................. 2008-125200

(51) Int. Cl.
G02F 1/1335 (2006.01)
G02F 1/1337 (2006.01)
(52) U.S. Cl. ........................................ 349/114; 349/129
(58) Field of Classification Search .................. 349/114, 349/129–130
See application file for complete search history.

(56) References Cited

U.S. PATENT DOCUMENTS

| 7,106,405 | B2* | 9/2006 | Okumura ................... 349/129 |
| 7,433,005 | B2* | 10/2008 | Yoshida et al. ............. 349/114 |
| 7,486,351 | B2* | 2/2009 | Itou et al. ................... 349/99 |
| 2003/0112213 | A1 | 6/2003 | Noguchi et al. |
| 2005/0001959 | A1 | 1/2005 | Chang |
| 2005/0264730 | A1 | 12/2005 | Kataoka et al. |
| 2006/0125755 | A1 | 6/2006 | Noguchi et al. |
| 2011/0037914 | A1 | 2/2011 | Noguchi et al. |

FOREIGN PATENT DOCUMENTS

| CN | 1416004 A | 5/2003 |
| JP | 2003-149647 | 5/2003 |
| JP | 2003-315766 | 11/2003 |
| JP | 2004-198920 | 7/2004 |
| JP | 2004-302174 | 10/2004 |
| JP | 2004-341524 | 12/2004 |
| JP | 2005-338472 | 12/2005 |

OTHER PUBLICATIONS

International Search Report for PCT/JP2009/052919, mailed Apr. 14, 2009.

* cited by examiner

*Primary Examiner* — James Dudek
(74) *Attorney, Agent, or Firm* — Nixon & Vanderhye P.C.

(57) ABSTRACT

The present invention provides a transflective liquid crystal display device having a high aperture ratio. The present invention is a liquid crystal display device, comprising:
a first substrate;
a liquid crystal layer; and
a second substrate in this order,
wherein the first substrate includes a pixel electrode having a trunk portion, a plurality of branch portions branched from the trunk portion, and slits,
the liquid crystal display device comprises a display region including a region where the branch portions and the slits are alternately arranged,
the display region includes a reflection region and a transmission region, and
in the reflection region, the pixel electrode, a reflective film disposed under the pixel electrode, and a $\lambda/4$ retarder are arranged.

20 Claims, 8 Drawing Sheets

LIQUID CRYSTAL DISPLAY DEVICE

This application is the U.S. national phase of International Application No. PCT/JP2009/052919 filed 19 Feb. 2009, which designated the U.S. and claims priority to JP Application No. 2008-125200 filed 12 May 2008, the entire contents of each of which are hereby incorporated by reference.

TECHNICAL

The present invention relates to a liquid crystal display device. More particularly, the present invention relates to a transflective liquid crystal display device.

BACKGROUND ART

Liquid crystal display (LCD) devices are widely used in electronic apparatuses such as a monitor, a projector, a mobile phone, and a personal digital assistant (PDA) by utilizing their characteristics such as slim-profile, lightweight, and low-power-consumption characteristics. As such LCD devices, transmissive LCD devices, reflective LCD devices, transflective LCD devices (reflective-transmissive LCD devices), and the like are known. Transmissive LCD devices perform display by using light emitted from the back side, such as light from a backlight that is provided on the back side of an LCD panel. The light is introduced into the LCD panel from the back side and then emitted. Reflective LCD devices perform display by using light incident from the front side (viewing side) such as ambient light and light from a frontlight. The light is introduced into an LCD panel from the front side and then reflected. Transflective LCD devices perform transmissive display by using light from the back side in relatively dark environments such as indoor environments, and perform reflection display by using light from the front side in relatively bright environments such as outdoor environments. That is, the transflective LCD devices have a feature of reflective LCD devices in which excellent visibility is provided in bright environments and a feature of transmissive LCD devices in which excellent visibility is provided in dark environments.

Multi-domain vertical alignment LCD (hereinafter, referred to simply as an MVA-LCD) devices are also known as an LCD device including vertically aligned liquid crystals with negative dielectric anisotropy and a structure for alignment control such as banks (linear projections) on a substrate and/or electrode-free parts (slits).

With respect to such MVA LCD devices, Patent Document 1 discloses the following MVA-LCD device in which slit-like aperture parts in an electrode and/or dielectric protruding members on an electrode are disposed as an alignment control means for liquid crystals in each of a region (transmission region) contributing to transmissive display and a region (reflection region) contributing to reflection display. In such a device, the aperture parts are formed in such a configuration that the area of the aperture parts in the reflection region and/or the area of the protruding members in the planar direction of the substrate in the reflection region are larger than the area of the apertures in the transmission region and/or the area of the protruding members in the planar direction of the substrate, whereby a voltage becomes less likely to be applied to an LC layer in the reflection region, which allows electrooptics characteristics identical between the reflection display and the transmissive display.

However, in the MVA-LCD devices, the regions where the alignment control technique such as the aperture parts and the protruding members are arranged cause a reduction in an aperture ratio, which results in low white luminance and dark display. In this aspect, the MVA-LCD devices need to be improved.

In contrast to this, a technology for providing a pretilt angle using a polymer is known as a method for controlling alignment of liquid crystals without using the alignment control means such as the apertures or the protruding members, as disclosed in Patent Document 2. According to the technology for providing a pretilt angle using a polymer, a liquid crystal composition prepared by mixing a polymerizable component such as a monomer and an oligomer to liquid crystals is encapsulated between substrates, and the polymerizable component is then polymerized under the condition that liquid crystal molecules are tilted by applying a voltage between the substrates. Thus, an LC layer that makes LC molecules tilt (incline) in a given direction by voltage application can be provided. FIG. 4 in Patent Document 2 discloses an LCD device including stripe electrodes in which the width thereof is 3 μm and the width of a space between the adjacent stripe electrodes is 3 μm.

[Patent Document 1]
   Japanese Kokai Publication No. 2004-198920
[Patent Document 2]
   Japanese Kokai Publication No. 2003-149647

DISCLOSURE OF INVENTION

The present invention has been made in view of the above-mentioned state of the art. The present invention has an object to provide a transflective LCD device having a high aperture ratio.

The present inventors made various investigations on a transflective LCD device. According to a display mode using, as a display region, a region where a pixel electrode having a trunk portion and a plurality of branch portions branched from the trunk portion are disposed and where the branched portions and slits are alternately arranged, the area of a region where an alignment control means is arranged can be reduced, which allows an improvement in an aperture ratio. Thus, the above-mentioned problems have been admirably solved, leading to completion of the present invention.

That is, the present invention is a liquid crystal display device, comprising:
   a first substrate;
   a liquid crystal layer; and
   a second substrate in this order,
   wherein the first substrate includes a pixel electrode having a trunk portion, a plurality of branch portions branched from the trunk portion, and slits,
   the liquid crystal display device comprises a display region including a region where the branch portions and the slits are alternately arranged,
   the display region includes a reflection region and a transmission region, and
   in the reflection region, the pixel electrode, a reflective film disposed under the pixel electrode, and a λ/4 retarder are arranged.

The present invention is mentioned below in more detail.

The LCD device of the present invention includes the first substrate, the liquid crystal layer, and the second substrate in this order. The LCD device performs display by changing the retardation of the LC layer by varying a voltage applied to the LC layer.

The first substrate includes a pixel electrode provided with a trunk portion and a plurality of branch portions branched from the trunk portion. The pixel electrode is formed in every pixel and used for voltage application to the LC layer. The pixel electrode with such a shape is what is called a fishbone electrode. The pixel electrode preferably has a configuration in which the trunk portion has a cross shape and divides a pixel into four regions and the plurality of branch portions extend in the four regions. In order to improve viewing angle characteristics, when the cross-shaped trunk portion extends at 0°, 90°, 180°, and 270°, the four regions preferably correspond to a region in which the branch portions extend at 45°; a region in which the branch portions extend at 135°; a region in which the branch portions extend at 225°; and a region in which the branch portions extend at 315°.

The LCD device of the present invention includes a display region including a region in which the branch portions and the slits (pixel electrode-free part) are alternately arranged. In the region in which the branch portions and the slits are alternately arranged, in order to provide stable alignment of LC molecules with only the fishbone electrode in the first substrate and without forming the alignment control means in the second substrate, it is preferred that the branch portion has a width of 3 μm or less and the slit has a width of 3 μm or less.

The display region includes a reflection region and a transmission region. The transmission region means a region contributing to transmissive display and the reflection region means a region contributing to reflection display. Specifically, light used for the transmissive display passes through the LC layer in the transmission region, and light used for the reflection display passes through the LC layer in the reflection region. The pixel electrode, a reflective film disposed under the pixel electrode, and a λ/4 retarder are arranged in the reflection region. The λ/4 retarder has optical anisotropy and causes an optical path difference of λ/4 between two polarization components oscillating vertically to each other, and has a function of converting linearly-polarized light into circularly-polarized light or converting circularly-polarized light into linearly-polarized light. Such a λ/4 retarder is used for reflection display. The λ/4 retarder is arranged in at least the reflection region, and may be arranged in the transmission region. The λ/4 retarder is, for example, arranged between the LC layer and a polarizer and provided in both the transmission region and the reflection region.

A region where the trunk portion of the pixel electrode is arranged is preferably used as the reflection region. According to the embodiment where the cross-shaped trunk portion divides a pixel into four regions and a plurality of branch portions extend in the four regions, the alignment direction of the liquid crystals is different among the four regions, and the region where the trunk portion is arranged is a boundary of the regions different in alignment direction of the liquid crystals. For this reason, in the region where the trunk portion is arranged, the alignment of the liquid crystals is hard to be stabilized, which may cause rough display. The reflection display is not designed based on such high display qualities as in the transmissive display. Therefore, the influence on the display qualities can be suppressed even if the trunk portion is not light-shielded and is used as a reflection region. As a result, the aperture ratio can be improved.

At least in a region overlapping with the slits of the pixel electrode, the reflective film needs to be arranged under the pixel electrode. In a region overlapping with the trunk portion or the branch portions of the pixel electrode, the reflective film may be formed above the pixel electrode. When the reflective film is formed above the pixel electrode, an optical path of light used for reflection display can be shortened, leading to an improvement in reflectance.

In the LCD device of the present invention, in order to improve display qualities of reflection display, it is preferred that the thickness of the liquid crystal layer in the reflection region is 60% or more of the thickness of the liquid crystal layer in the transmission region.

It is more preferred that the thickness of the liquid crystal layer in the reflection region is substantially identical to the thickness of the liquid crystal layer in the transmission region. Such an LCD device does not include a multi-gap structure that includes an LC layer whose thickness in the reflection region is about half of its thickness in the transmission region, so that the production steps are simplified advantageously. The thickness of the LC layer in the reflection region is substantially identical to the thickness of the LC layer in the transmission region, so that the response speed of the liquid crystals in the reflection region can be made the same as that in the transmission region. As a result, voltage application conditions on overshoot driving in the transmission region can be made the same as in the transmission region and the reflection region. The overshoot driving is a liquid crystal driving method for applying a (overshot or undershot) driving voltage higher than or lower than a predetermined gradation voltage for an input image signal of the present frame to the LCD panel, according to the combination of an input image signal in the present frame and that in the previous frame, thereby improving the response speed of the liquid crystals If the multi-gap structure is not used in the transflective LCD device, voltage-luminance characteristics (voltage-reflection luminance characteristics) of the reflection region differ from voltage-luminance characteristics (voltage-transmission luminance characteristics) of the transmission region. Specifically, light used for transmissive display enters the LCD panel from the back side and passes through the LC layer only once before being output. On the other hand, light used for reflective display enters the LCD panel from the front side and passes through the LC layer twice before being output. So an effective retardation value of the reflection region, which is determined based on the LC layer thickness that is twice as larger as that of the transmission region, needs to be taken into consideration. The LC layer thickness in the transmission region is substantially identical to that in the reflection region. So the effective retardation value of the LC layer in the reflection region is larger than that of the LC layer in the transmission region when the liquid crystals in the transmission region and those in the reflection region are driven by the same voltage. Accordingly, when the voltage-luminance characteristics of the reflection region are plotted on a graph showing the voltage applied to the pixel electrode along the horizontal axis and showing the luminance along the vertical axis, the curve showing the voltage-reflection luminance characteristics is steeper than the curve showing the voltage-transmission luminance characteristics. Further an applied voltage Rmax where the luminance of the reflection region shows a local maximum value is smaller than an applied voltage Tmax where the luminance of the transmission region shows a local maximum value, and the luminance of the reflection region when a voltage (for example, Tmax) larger than Rmax is applied is lower than that of the reflection region when a voltage of Rmax is applied. In other words, although the luminance of the reflection display increases as the applied voltage increases, the luminance of the reflection display shows a local maximum value at a voltage (Rmax) lower than the applied voltage (Tmax) where the luminance of the transmission display shows a local maximum value and then monotonically decreases as the applied voltage increases. Therefore, when the thickness of the LC layer in the transmission region is made the same as that in the reflection region, and when the transmission region and the reflection region are integrally driven by the same signal, gray scale inversion in reflective display is generated.

In contrast to this, in the present invention, the voltage-reflection luminance characteristics which are not likely to cause gray scale inversion can be obtained without using the multi-gap structure by adjusting the proportion of the area occupied by the slits in the reflection region. That is, the present inventors found that in the region where the slit is arranged within the reflection region, transmittance is decreased because the voltage is less easily applied to the LC layer than that in the region where the branch portion of the pixel electrode is arranged even if the width of the slit is decreased to 5 µm or less. Accordingly, in the slit region, the applied voltage Rmax where the luminance of the reflection region shows a local maximum value is increased and Rmax is the same as or greater than the voltage Tmax where the luminance of the transmission region shows the local maximum value (slit region Rmax≧Tmax>electrode region Rmax). By utilizing such a slit region for reflection display (by adjusting the area occupied by the electrode region and the slit region within the reflection region), the voltage-luminance characteristics of the reflection region can be made similar to the voltage-luminance characteristics of the transmission region even if the transmission region and the reflection region are driven by the same signal voltage. As a result, gray scale inversion of the reflection display can be suppressed. Specifically, it is preferred that the proportion of the area occupied by the slit of the pixel electrode in the reflection region relative to the area of the entire reflection is 30% or more. The adjustment of the proportion of the area occupied by the slit in the reflection region eliminates the need to drive LCs in the transmission region and LCs in the reflection region with different signal voltages even if the multi-gap structure is not formed. Therefore, a thin film transistor (TFT) and the like do not need to be individually formed in the transmission region and the reflection region, leading to a high aperture ratio.

Examples of a method for adjusting the proportion of the area occupied by the slit in the reflection region include making the width of the electrode in the reflection region smaller than that in the transmission region; expanding the width of the reflective film in the vicinity of the trunk portion; and arranging the reflective film under the slit.

The first substrate preferably includes a polymer formed on a surface of the substrate by polymerizing a polymerizable component added in the liquid crystal layer while a voltage is applied to the liquid crystal layer, the polymer having a surface structure for regulating a pretilt angle of liquid crystal molecules and/or an alignment direction of the liquid crystal molecules in the presence of an applied voltage. According to such a configuration, a reduction in the aperture ratio can be suppressed and the response speed of the liquid crystals can be improved.

The liquid crystal layer preferably includes liquid crystal molecules aligned in a direction vertical to the surface of the substrate in the absence of an applied voltage and aligned in a direction parallel to the surface of the substrate in the presence of an applied voltage. The LCD device including such an LC layer is referred to as a vertical alignment (VA) LCD device. In order to achieve the normally black LCD device, which provides a high contrast ratio, LC molecules with negative dielectric anisotropy are used. The LCD device of the present invention may be a normally black one (the LCD device in which the light transmittance or the luminance under an off-state is lower than that under an on-state), or may be a normally white one (the light transmittance or the luminance under an off-state is higher than that under an on-state).

As a preferred configuration of the reflective film, signal lines are used. The reflective film is preferably a storage capacitor bus line, a gate bus line, or a source bus line. The signal lines are needed for driving an active matrix LCD device. By using the signal lines also as a reflective film, there is no need for adding any other steps of forming the reflection region to the production method of transmission LCD devices. As a result, a transflective LCD device can be easily produced. The reflective film other than the pixel electrode is used for reflective display, so that the same material such as indium tin oxide (ITO) can be used for both of the pixel electrode in the transmission region and that in the reflection region. As a result, flicker caused due to the optimum voltage difference between transmissive display and reflective display can be suppressed.

Among the signal lines, the storage capacitor bus line is arranged in the display region to form a storage capacitor in each pixel, and therefore in order to achieve a high aperture ratio, the storage capacitor bus line is preferably used as a reflective film. As the reflective film, used may be a conductor that is formed on a layer on which the signal lines are formed and that is formed separately from the signal lines, and in this case, the reflective film can be formed in the same process for forming the signal lines.

As a preferred configuration of the LCD device of the present invention, the configuration in which the first substrate further includes, under the pixel electrode, a conductive part and an insulating film covering the conductive part, the insulating film having an aperture in the reflection region, the conductive part and the pixel electrode being electrically connected to each other at the aperture, the thickness of the liquid crystal layer in a region where the aperture is formed being larger than the thickness of the liquid crystal layer in the transmission region, is mentioned. The LC layer thickness in the region where the aperture is formed is greater than that in other regions. Therefore, when the voltage Tmax where the luminance of the transmission region shows a local maximum value is applied to the reflection region and the transmission region, the effective retardation value of the LC layer in the region where the aperture is formed within the reflection region is more than twice as much as the retardation value of the LC layer in the transmission region. In such a configuration, according to the voltage-luminance characteristics of the region where the aperture is formed, in the range of the applied voltage not more than the local maximum-luminance voltage Tmax of the transmission region, the first local maximum-luminance voltage appears and then at least the local minimum-luminance voltage and the second local maximum-luminance voltage appear in this order as the applied voltage increases. The use of the voltage-luminance characteristics of the region where the aperture is formed allows the followings. In the range of the applied voltage of more than the local maximum-luminance voltage Rmax of the other regions of the reflection region, a monotonic decrease of the luminance of the other regions in the reflection region can be compensated by the second or later monotonic increase of the luminance in the region where the aperture is formed by combining the voltage-luminance characteristics of the region where the aperture is formed and the voltage-luminance characteristics of the other regions in the reflection region.

It is preferable that the thickness of the liquid crystal layer in the region where the aperture is formed is 1.1 to 3.0 times as large as the thickness of the liquid crystal layer in the transmission region. If the LC layer thickness in the region where the aperture is formed is less than 1.1 times as large as that in the transmission region, the compensation attributed to the second monotonic increase of the region where the aperture is formed might not be sufficiently obtained. So the voltage where inversion of the luminance is generated might be shifted to the low voltage side in the combined voltage-luminance characteristics of the reflection region. If the LC layer thickness in the region where the aperture is formed is more than 3 times as large as that in the transmission region, a first local maximum voltage, a local minimum voltage, and a second local maximum voltage in the region where the aperture is formed are largely shifted to the lower voltage side. So the combined voltage-luminance characteristics of the region where the aperture is formed do not show the monotonic increase before the first local maximum voltage, and the voltage where inversion of the luminance is generated is shifted to the low voltage side. It is more preferred that the LC layer thickness in the region where the aperture is formed is 1.5 to 2.5 times as large as the LC layer thickness in the transmission region.

The aperture is what is called a contact hole. The conductive part used herein means not only a member made of a conductive material but also a member made of a semiconductor material. Examples of the conductive part include a drain electrode of a thin film transistor (TFT).

The pixel electrode in the transmission region is preferably formed of a transparent conductive material, and
the pixel electrode in the reflection region includes a reflective conductive film, is mentioned.
When the reflective conductive film is included in the pixel electrode in the reflection region, as compared to the case where the reflective conductive film that is formed in a lower layer lower than the pixel electrode is used for reflection display, the optical path of light used for reflection display is shortened, and a decrease in reflectance due to absorption or interface reflection of the light by a material for the lower layer such as a transparent resin can be suppressed. As a result, the reflectance can be improved. Examples of the transparent conductive material include indium tin oxide (ITO), indium zinc oxide (IZO), and zinc oxide. Examples of the reflective conductive film include aluminum (Al). The pixel electrode in the reflection region is preferably a laminated body of a transparent conductive film and the reflective conductive film. The pixel electrode in the reflection region preferably includes, in the uppermost layer of the pixel electrode, a film made of a material whose work function is different from that of the transparent conductive film in the transmission region by less than 0.3 eV, the uppermost layer facing the liquid crystal layer. According to the configuration, flicker caused due to the in an optimum voltage difference between the transmission region and the reflective region can be suppressed. When the transparent conductive film in the transmission region is made of ITO, molybdenum nitride (MoN) or IZO, for example, is suitably used for the film provided as the uppermost layer facing the LC layer of the pixel electrode in the reflection region.

The second substrate preferably includes a common electrode in the reflection region, the common electrode being provided with a slit or an aperture. Such an embodiment is suitable for the adjustment of the proportion of the area occupied by a non-electrode region in the reflection region. In order to stabilize alignment of LC molecules, it is preferred that the width of the slit or an aperture formed in the common electrode is 3 µm or less. Examples of the shape of the slit or the aperture include, but not limited to, a straight line shape, a circumferential shape, and a cross shape. When the common electrode is provided with a cross-shaped slit or aperture, the slit or the aperture may be formed extending in the directions of 45°, 135°, 225°, and 315°, similarly to the slit formed in the pixel electrode of the first substrate.

It is preferred that the sum of the area occupied by the slit in the pixel electrode relative to the area of the entire reflection region and the area occupied by the slit and the aperture in the common electrode relative to the area of the entire reflection region is 30% or more. Upon calculation of the sum of the proportions, when the slit of the pixel electrode overlaps with the slit or the aperture of the common electrode, the overlapping region is counted in either the proportion of the area occupied by the slit or the aperture in the common electrode or the proportion of the area occupied by the slit in the pixel electrode. The embodiment where a proportion of an area occupied by a slit and an aperture of the common electrode is 30% or more relative to an entire reflection region is preferably employed. This embodiment is preferred in the case where it is difficult to increase the proportion of the area occupied by the slit of the pixel electrode.

As a preferred embodiment of the LCD device of the present invention, the embodiment in which the width of the slit in the transmission region differs from the width of the slit in the reflection region. It is preferred that the width of the branch portion of the pixel electrode in the transmission region differs from the width of the branch portion of the pixel electrode in the reflection region. According to the embodiment, the pixel electrode in the transmission region is formed to have the same shape as that of the pixel electrode in the reflection region, thereby preventing a difference in display quality between the transmission region and the reflection region from being generated by influences of elements other than the area occupied by the slit. Further, the gap between the branched portions in the transmission region is made different from that in the reflection region, thereby adjusting the proportion of the area occupied by the slit between the transmission region and the reflection region. As a result, the desired display qualities can be achieved with a simpler design.

The LCD device of the present invention is not especially limited as long as it includes the above-mentioned components. For example, the LCD device of the present invention has the following configuration: a first polarizing element and a first $\lambda/4$ retarder are attached to the back side of the back-side substrate in this order toward an LC layer side, the first $\lambda/4$ retarder being arranged so that the slow axis thereof is at an angle of 45° to the absorption axis of the first polarizing element; and a second polarizing element and a second $\lambda/4$ retarder are attached to the viewing side of the viewing-side substrate in this order toward an LC layer side, the second $\lambda/4$ retarder being arranged so that the slow axis thereof is at an angle of 45° to the absorption axis of the second polarizing element and the slow axis thereof is at an angle of 90° to the slow axis of the first $\lambda/4$ retarder.

Effect of the Invention

The present invention can provide a transflective LCD device with a reduced area where an alignment control means is formed and a high aperture ratio because a pixel electrode including a trunk portion and a plurality of branch portions branched from the trunk portion is formed and a region where the branched portions and slits are alternately arranged is used as a display region.

Best Modes for Carrying Out the Invention

The present invention is mentioned in more detail below with reference to Embodiments, but not limited only thereto.

Embodiment 1

In Embodiment 1, a region where a pixel electrode is arranged, a region where a slit of the pixel electrode is arranged, and a region where a contact hole is arranged are used for reflection display. The voltage-reflectance characteristics (V-R characteristics) of the three regions, which are different from one another, are combined to provide the V-R characteristics of reflection display showing no gray scale inversion against voltage-transmittance characteristics of transmissive display.

FIG. 1 is a plan view schematically showing a pixel of an LCD device in accordance with Embodiment 1. FIG. 2 is a schematic cross-sectional view taken along line A-B in FIG. 1. In the present Embodiment, a WVGA panel having a diagonal dimension of 8 inches (a pixel pitch of 72.5 μm×217.5 μm and the number of pixels of 800×RGB×480) is produced. The LCD device in accordance with the present Embodiment includes a back-side substrate 10, a viewing-side substrate 60 facing the back-side substrate 10, and an LC layer 100 disposed between the back-side substrate 10 and the viewing-side substrate 60. The LCD device in accordance with the present Embodiment is a transflective LCD device (a reflective-transmissive LCD device) including a transmission region T and a reflection region R, and capable of performing both transmissive display and reflection display. The transmissive display is performed by using as a light source a backlight disposed on the back side of the back-side substrate 10, and the reflection display is performed by using as a light source ambient light that has entered the LC layer 100 from the viewing side or using a front light.

As shown in FIG. 1, the back-side substrate 10 includes a plurality of gate signal lines 13 extending in parallel with one another; a plurality of storage capacitor (Cs) lines 14 extending in parallel with one another; a plurality of source signal lines 16 extending in parallel with one another and perpendicular to the gate signal lines 13 and the storage capacitor lines 14; a thin film transistor (TFT) 30 formed at each intersection of the plurality of gate signal lines 13 and the plurality of source signal lines 16. The gate signal lines 13 are formed of a laminated body of TiN/Al/Ti. The source signal lines 16 are formed of a laminated body of Al/Ti.

The TFT 30 includes agate electrode connected to the gate signal line 13, a source electrode connected to the source signal line 16, and a drain electrode 17 electrically connected to a pixel electrode 19 through a contact hole 31. The drain electrode 17 and the storage capacitor line 14 are arranged facing each other with a gate insulating film 15 therebetween. The storage capacitance (Cs) is formed by the gate insulating film 15 that is located between the drain electrode 17 and the storage capacitor line 14.

The contact hole 31 is an aperture having a transparent conductive film therein formed in an interlayer insulating film 18, and a transparent conductive film that constitutes the pixel electrode 19 is formed therein. As shown in FIG. 2, the back-side substrate 10 has a configuration in which a base coat film 12, the gate signal line 13 (the storage capacitor line 14), the gate insulating film 15, the source signal line 16 (the drain electrode 17), the interlayer insulating film 18, the pixel electrode 19, and a vertical alignment film (not shown) are stacked in this order on a glass substrate 11. The contact hole 31 is used for electrically connecting the pixel electrode 19 to the drain electrode 17, and is farmed as a depression in the LC layer 100 side-surface of the back side-substrate 10. According to the present Embodiment, one contact hole 31 is provided in the center of each pixel. Two or more contact holes 31 may be provided in each pixel.

As shown in FIG. 1, the pixel electrode 19 is formed in a cross shape and composed of a trunk portion 19a dividing a pixel into four regions and a plurality of branch portions 19b extending from both sides of the trunk portion 19a. In order to improve viewing angle characteristics, the branch portions 19b that extend in different directions are formed in the four regions divided by the trunk portion 19a. Specifically, when the cross-shaped trunk portion extends at 0°, 90°, 180°, and 270°, the four regions are composed of a region in which the branch portions extend at 135°; a region in which the branch portions extend at 225°; and a region in which the branch portions extend at 315°. The width of the trunk portion 19a is 3.0 μm. The width of the branch portion 19b is 2.5 μm. The gap (the width of a slit) between the branch portions 19b is 2.5 μm. The pixel electrode 19 is formed of ITO.

In the present Embodiment, the storage capacitor line 14 functions also as a reflective film for reflecting ambient light. The use of the storage capacitor line 14 as a reflective film eliminates a need for forming a reflective film used only for reflection display. Therefore, there is no need to add any other process to the production process of transmissive LCD devices. The same advantage can be obtained also by using as a reflective film the gate signal line 13, the source signal line 16, or a conductor that is formed in the same layer including the respective lines 13, 14, and 16 but formed separately therefrom.

The plurality of storage capacitor lines 14 are formed in parallel to one another in the back-side substrate 10. Pixels in the same row of a plurality of pixels arranged in a matrix pattern use a single common storage capacitor line 14. A branched part 14a extending in the direction parallel to the extension direction of the source signal line 16 (the vertical directions in FIG. 1) is formed in each pixel. The storage capacitor line 14 is overlapped with the almost entire trunk portion 19a of the pixel electrode 19, other than the trunk portion 19a near the gate signal line 13. The storage capacitor line 14 is also overlapped with part of the plurality of branch portions 19b of the pixel electrode 19 and with part of the slits between the adjacent branch portions 19b.

As mentioned above, in the present Embodiment, the cross-shaped region where the storage capacitor lines 14 are arranged is used as a reflection region, and four domains separated by the reflection region are used as a transmission region. The area proportions of the four domains of each pixel in the transmission region are the same as one another, and therefore a uniform display with a large viewing angle can be provided. The contact hole 31 is placed inside the reflection region (hole region). The following Table 1 shows the area proportions of the respective regions in the display region (the region surrounded by the dotted line in FIG. 1).

TABLE 1

| Display region | 8488 | Transmission region | 5874 | Electrode region | 3926 |
|---|---|---|---|---|---|
| | | | | Slit region | 1948 |
| | | Reflection region | 2614 | Electrode region | 1594 |
| | | | | Slit region | 923 |
| | | | | Hole region | 96 |

As shown in Table 1, the proportion of the slit region to the reflection region is 35%.

Further, a polymer (not shown) of polyfunctional acrylate monomers is formed on the surface of a vertical alignment film on the back-side substrate 10 side. The polymer can be formed, for example, by the following steps: (1) nematic liquid crystals with negative dielectric anisotropy containing 0.3 wt % of a polyfunctional acrylate monomer having a (meth)acryloyl group are injected into an empty panel composed of the back-side substrate 10 and the viewing-side substrate 60 attached to each other with a sealing member, (2) the LC layer 100 is irradiated with UV light, which has a luminescent peak between 300 and 400 nm wavelength, at an intensity of 25 mW/cm$^2$ and a light dose of 30 J/cm$^2$ (both on I-ray (365 nm) basis) while applying an alternating-current voltage of 10 V to the LC layer 100. Monomers left in the LC layer 100 can be removed in the absence of an applied voltage by exposing the LC layer 100 to fluorescent light for 48 hours without applying a voltage to the LC layer 100. The polymer formed by the above-mentioned method has a surface structure regulating a pretilt angle of the LC molecules in the LC layer 100 and/or an alignment direction thereof in the present of an applied voltage.

The viewing-side substrate 60 has a configuration in which a color filter layer 62 including a colored layer and a black matrix (BM); a counter electrode 63; and a vertical alignment film (not shown) are stacked on a glass substrate 61 in this order. As the colored layer, any of a red (R) colored layer, a green (G) colored layer, and a blue (B) colored layer is disposed for each of the pixel electrodes 19 in the back-side substrate 10. The counter electrode 63 is not formed for each pixel, but formed to overlap with a plurality of pixels as one electrode (common electrode). The counter electrode 63 is formed of ITO.

Circularly polarizing plates 110 and 120 having a structure in which a polarizing element and a λ/4 retarder are laminated are attached to the back side of the glass substrate 11 in the back-side substrate 10 and to the viewing-side of the glass substrate 61 in the viewing-side substrate 60, respectively. In the circularly polarizing plates 110 and 120, the absorption axis of the polarizing element is arranged so as to make an angle of 45° with the slow axis of the λ/4 retarder. The absorption axes of the polarizing elements of the circularly polarizing plates 110 and 120 are arranged so as to make an angle of 90° with each other.

The LCD device of the present Embodiment is a vertical alignment (VA) LCD device, and the LC layer 100 is composed of nematic liquid crystals with negative dielectric anisotropy. The LC molecules in the LC layer 100 are aligned in the direction perpendicular to the alignment film surface of the substrates 10 and 60 in the absence of an applied voltage (an OFF-state) and inclined in the direction parallel to the alignment film surface in the presence of an applied voltage (an ON-state).

In the present Embodiment, the thickness of the LC layer 100 in the transmission region T, i.e., a cell gap $d_1$, is fixed to 3.2 μm. The liquid crystal material has a refractive index anisotropy Δn of 0.098. The product of the refractive index anisotropy Δn of the LC material and the height of the cell gap d1 is 314 nm. The reflection region R includes a slit region (a region in which the slit is formed) and an electrode region (a region in which the pixel electrode is formed) having a cell gap d1 that is the same as that of the transmission region T, and a hole region having a cell gap $d_2$ larger than that of the transmission region T ($d_1 < d_2$). The thickness of the pixel electrode 19 is 1400 Å, and much smaller than the cell gap (3.2 μm) and the depth (3.0 μm) of the depression of the hole region. Therefore, the difference in the cell gap between the electrode region and the slit region may be ignored in voltage-brightness characteristics.

The voltage applied to the pixel electrode-reflectance characteristics (V-R characteristics) of the LCD device in accordance with Embodiment 1 were simulated. FIG. 3 shows the results. The reflectance in FIG. 3 shows a luminance ratio relative to 100% of the maximum luminance in each region.

Reflection display light in the reflection region is a mixture of reflection display light in the electrode region, reflection display light in the slit region, and reflection display light in the hole region. Accordingly, the V-R characteristics of the reflection region R are a combination of the V-R characteristics of the three regions according to the area of each region. As shown in FIG. 3, in the LCD device of the present Embodiment, the reflectance of the electrode region increases with an increase in an applied voltage to reach the maximum value at 4.8 V, and then decreases with an increase in an applied voltage after the applied voltage exceeds 4.8 V. In the slit region, the effective retardation of the LC layer decreases because the voltage applied to the LC layer is smaller than that in the electrode region. Therefore, the reflectance of the slit region gradually increases with an increase in an applied voltage and reaches the maximum value at 6.0 V. In the hole region, the effective retardation of the LC layer increases because the cell gap in the hole region is larger than that in the electrode region and the slit region. As a result, the reflectance of the hole region steeply increases with an increase in the applied voltage to reach a first local maximum value at 3.0 V, and then decreases with increasing applied voltage to reach a local minimum value at 4.0 V, and then reaches a second local maximum value again at 6.0 V. The V-R characteristics of the entire reflection region obtained by combining the V-R characteristics of the three regions increase with increasing applied voltage to reach the maximum value at 5.5 V. The maximum value is maintained until the applied voltage reaches 6.0 V. Such V-R characteristics are substantially identical to those of the transmission region. As mentioned above, according to the LCD device of the present Embodiment, the proportion of the area occupied by the slit in the reflection region is adjusted to 30% or more in order to utilize the potential drop in the slit region for reflection display and further, by the contact hole is disposed in the reflection region. As a result, voltage applied to the pixel electrode-luminance characteristics in which no gray scale inversion is observed can be provided.

According to the present Embodiment, and as a result, the cell gap in much of the reflection region R is identical to that in the transmission region T. For this reason, the response speed of the LC molecules in the transmission region T is equal to that of the LC molecules in the reflection region R, so that the overshoot driving condition of the transmission region T can be made equal to the overshoot driving condition of the reflection region R. Accordingly, the response speed of the LC molecules is easily improved by the overshoot drive. Further, a process for forming a multi-gap structure can be eliminated.

In the present Embodiment, the same material can be used for the pixel electrode 19 in the transmission region T and for the pixel electrode 19 in the reflection region R. So the flicker due to the optimum voltage difference between the transmission region T and the reflection region R can be effectively reduced.

In the present Embodiment, the region where the branch portions and the slits are alternately arranged is used as the display region. Therefore the area of an alignment control means is reduced. In the LCD device of the present Embodiment, the aperture ratio of the transmission region was 37.3%, the aperture ratio of the reflection region was 16.6%, and the total thereof was 53.9%.

Changes in the V-R characteristics were simulated when the proportion of the area occupied by the slit region was changed from 20% to 60% by 10%. FIGS. 4 and 5 show the results. FIG. 4 shows the V-R characteristics of the entire reflection region. FIG. 5 is an enlarged view of a portion where the V-R characteristics of the entire reflection region shows the maximum value. The reflectance in each of FIGS. 4 and 5 show a luminance ratio relative to 100% of the maximum luminance in each condition. As shown in FIGS. 4 and 5, a voltage where the maximum luminance is given shifts to the high-voltage side with increasing proportion of the area occupied by the slit region.

Embodiment 2

FIG. 6 is a plan view schematically showing a pixel of an LCD device in accordance with Embodiment 2. FIG. 7 is a schematic cross-sectional view taken along line C-D in FIG. 6. In Embodiment 1, the ITO film 19 is used as a pixel electrode in both the transmission region and the reflection region. In Embodiment 2, an ITO film 19 (work function: 4.9 eV) is used as the transmissive electrode in the transmission region T, and a multilayer film of the ITO film 19 and an Al film (work function: 4.3 eV) 20 thereon is used as the reflective electrode in the reflection region R. The thickness of the reflective electrode is 1500 Å. The LCD device in Embodiment 2 has the same configuration as in Embodiment 1 except for the above-mentioned respects.

According to the present Embodiment, the optical path of light used for reflection display can be shortened and the reflectance can be improved because the reflective electrode including a reflective Al film 20 is arranged in the reflection region R. The reflective electrode is not particularly limited as long as it includes a film made of a reflective conductive material. The reflective electrode may be a multilayer film including a film other than the Al film 20.

Embodiment 3

FIG. 8 is a cross-sectional view schematically showing an LCD device in accordance with Embodiment 3. The LCD device of the present Embodiment has the same configuration as that of the LCD device of Embodiment 2 except that an MoN film (work function: 4.7 eV) 21 is staked on an Al film 20. That is, a reflective electrode has a three-layered structure where an ITO film 19, the Al film 20, and the MoN film 21 are stacked. The thickness of the MoN film 21 is 50 Å.

According to the present Embodiment, the ITO film (work function: 4.9 eV) 19 forming the transmissive electrode and the MoN film (work function: 4.7 eV) 21 forming the LC-layer-side outmost surface of the reflective electrode have a small difference in work function of 0.2 eV therebetween. Therefore, the flicker caused by the optimum voltage difference between the transmissive electrode and the reflective electrode can be suppressed. The film forming the LC-layer-side outmost surface of the reflective electrode may be an IZO film (work function: 4.8 eV). The thickness of the IZO film is, for example, 100 Å.

Embodiment 4

FIG. 9 is a plan view schematically showing a pixel of a LCD device in accordance with Embodiment 4. FIG. 10 is a schematic cross-sectional view taken along line E-F in FIG. 9. The LCD device of the present Embodiment has the same configuration as that of the LCD device of Embodiment 1 except that an aperture 63a is formed in a counter electrode 63 disposed in the region (a portion other than a fishbone structure) facing a trunk portion 19a of a pixel electrode 19 and the position of a contact hole is changed to a position not facing the aperture 63a in the reflection region. The size of the aperture 63a is 8 μm in length and 2 μm in width. The proportion of the area occupied by the aperture 63a to the entire reflection region is 2%.

According to the present Embodiment, the proportion of the area occupied by the non-electrode region in the reflection region can be increased to 37%.

The shape of the aperture formed in the counter electrode 63 may be, but not particularly limited to, a circular aperture 63b shown in FIG. 11, for example. The size of the aperture 63b is 8 μm in outer circumference length and 2 μm in width.

The present application claims priority to Patent Application No. 2008-125200 filed in Japan on May 12, 2008 under the Paris Convention and provisions of national law in a designated State, the entire contents of which are hereby incorporated by reference.

EXPLANATION OF NUMERALS AND SYMBOLS

Figure 1:
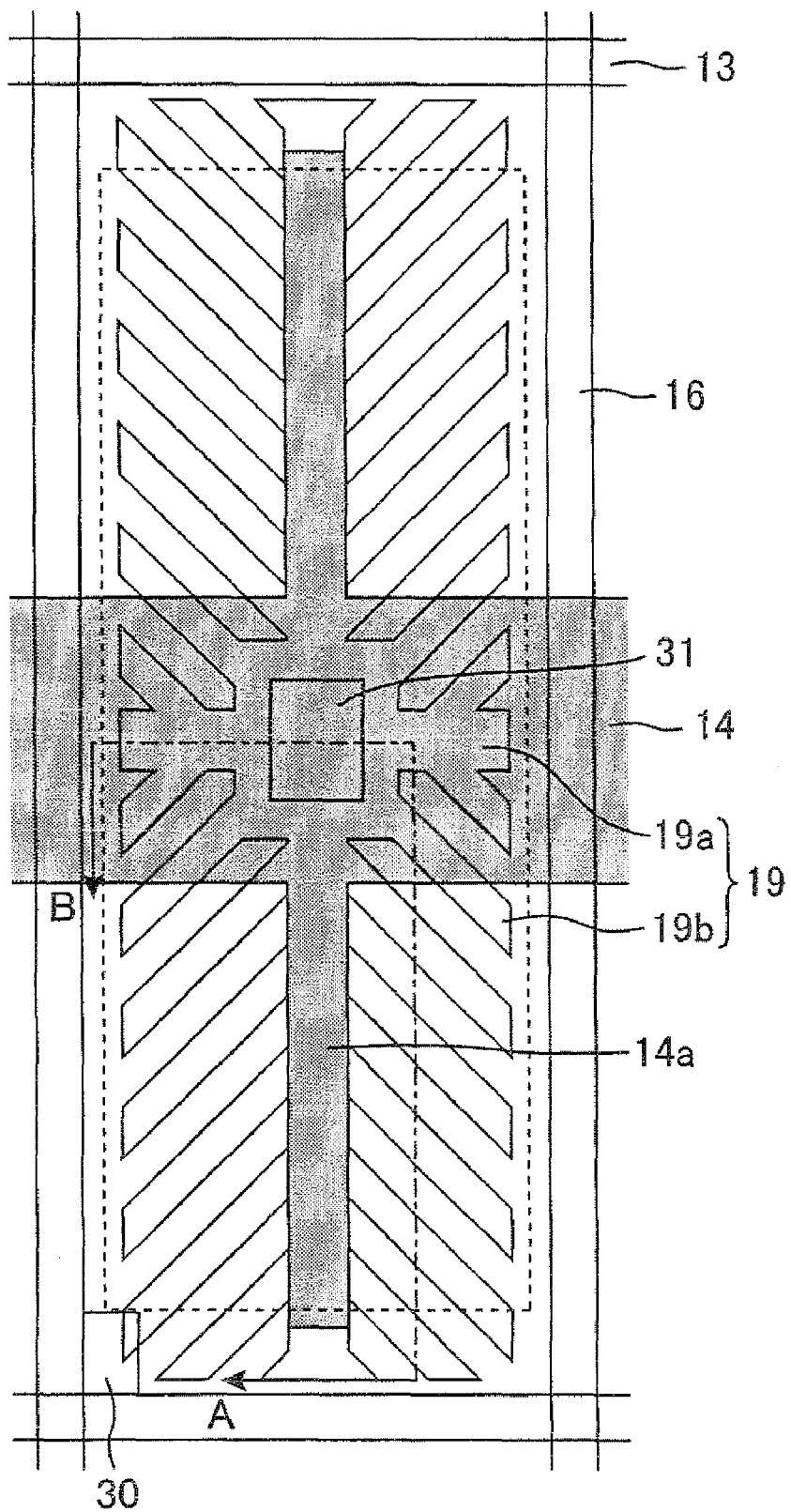
FIG. 1 is a plan view schematically showing a pixel of a liquid crystal display device in accordance with Embodiment 1.
Figure 2:
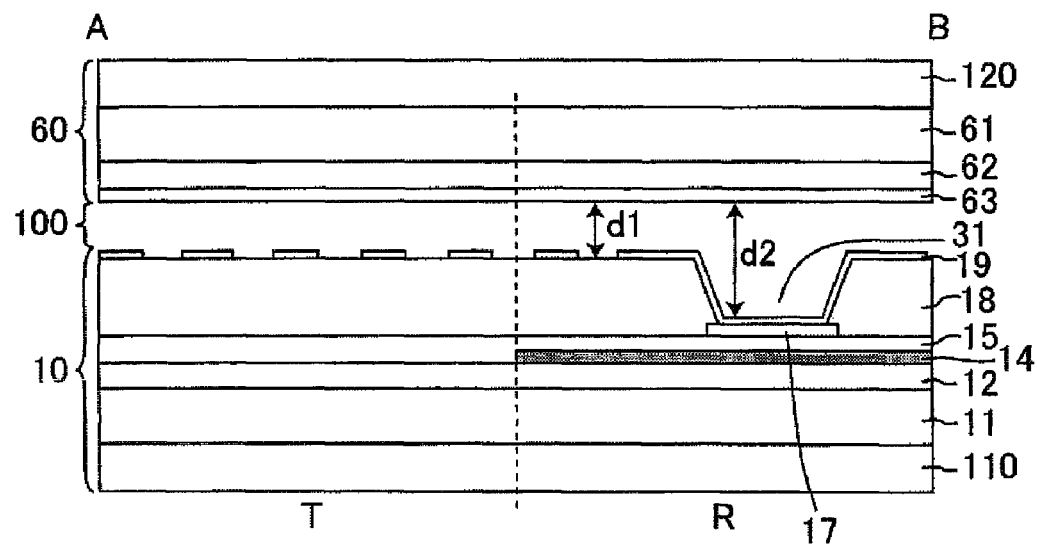
FIG. 2 is a schematic cross-sectional view taken along line A-B in FIG. 1.
Figure 3:
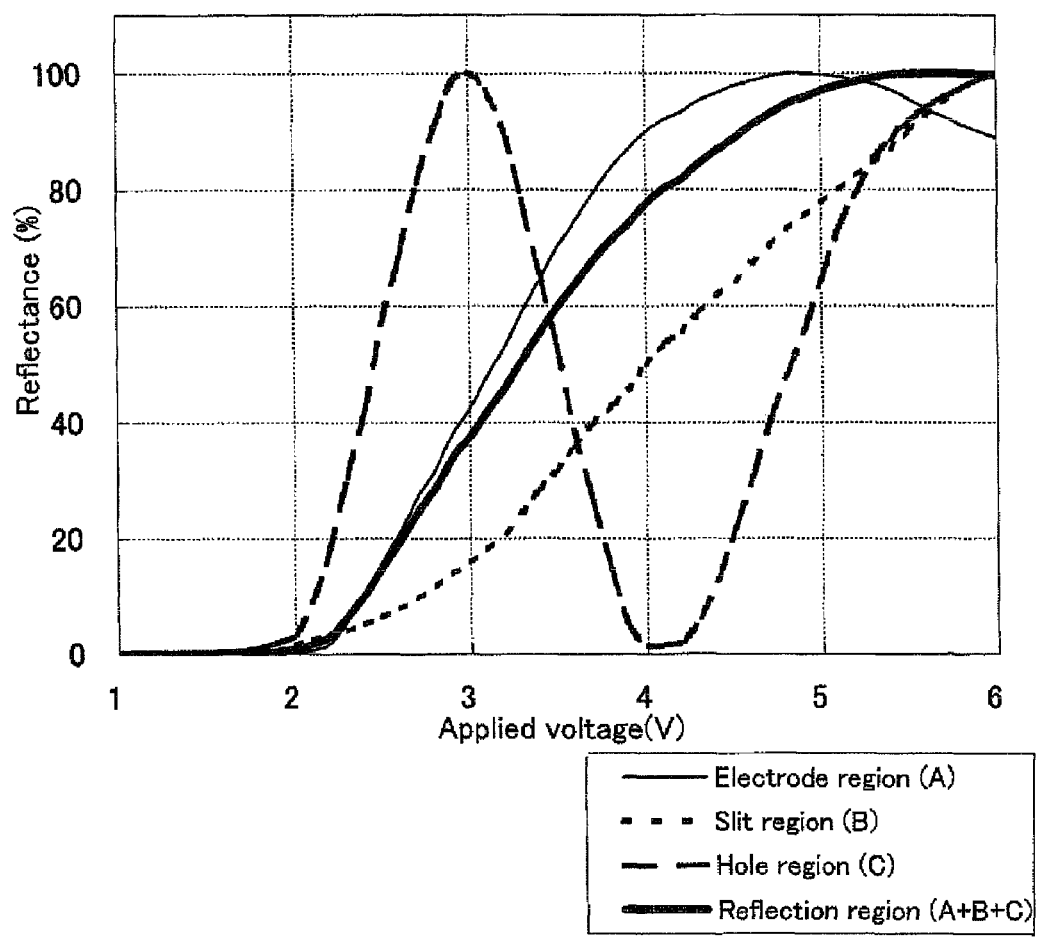
FIG. 3 is a graph showing simulation results of the voltage applied to the pixel electrode-reflectance characteristics (V-R characteristics) of a liquid crystal display device in accordance with Embodiment 1.
Figure 4:
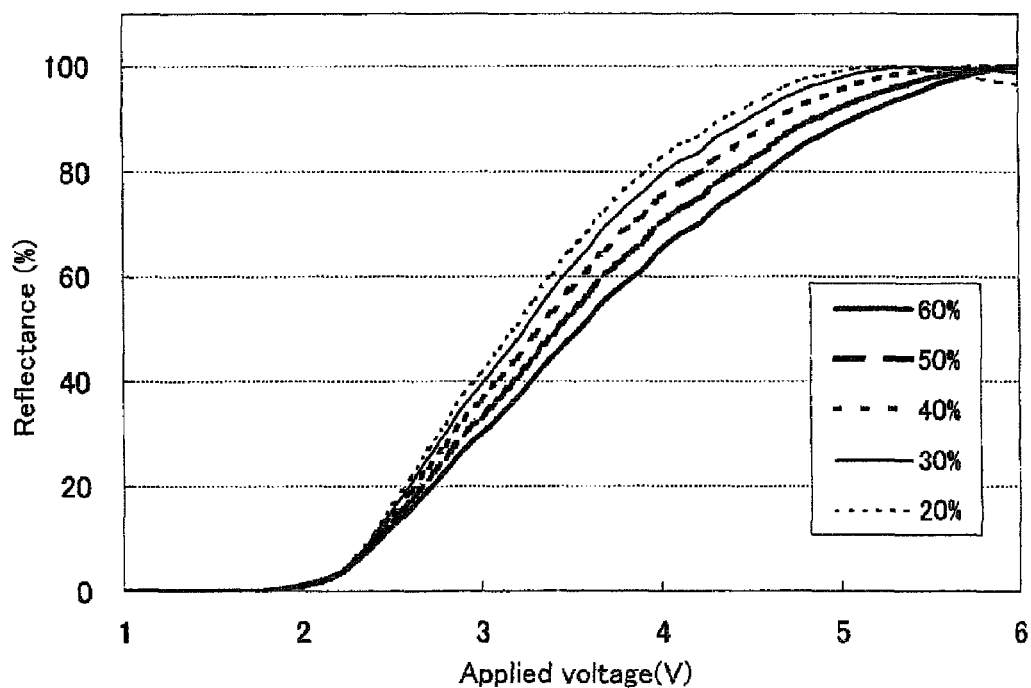
FIG. 4 shows the relationship between the proportion of the area occupied by the slit region in the reflection region and the V-R characteristics of the entire reflection region.
Figure 5:
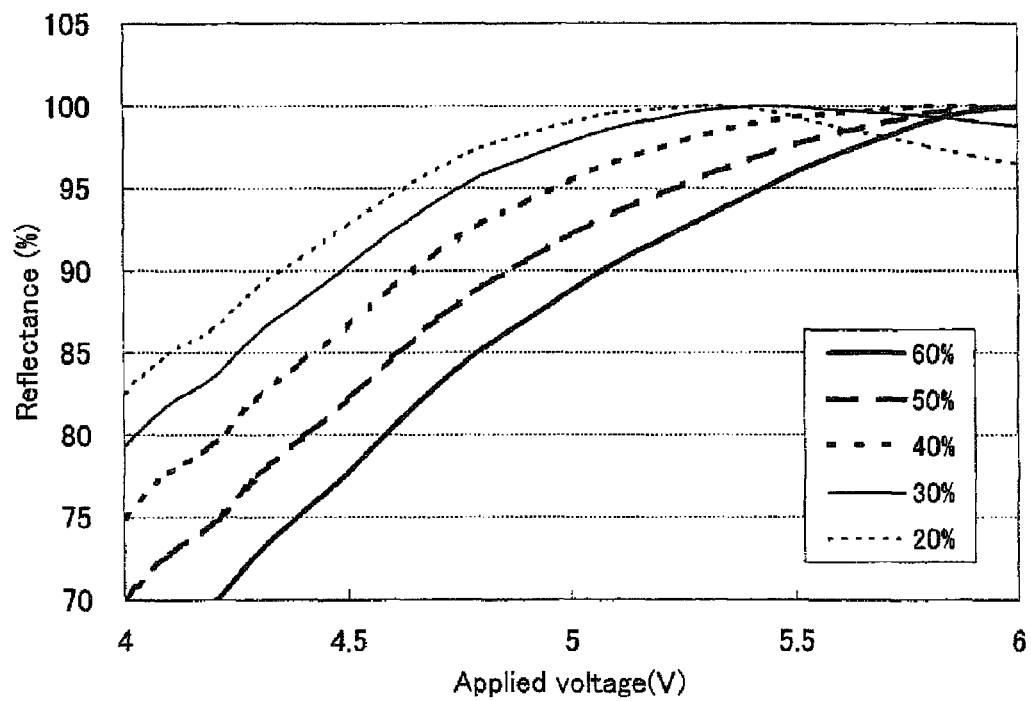
FIG. 5 is an enlarged view of a portion where the V-R characteristics of the entire reflection region shows the maximum value in the figure showing the relationship between the proportion of the area occupied by the slit region in the reflection region and the V-R characteristics of the entire reflection region.
Figure 6:
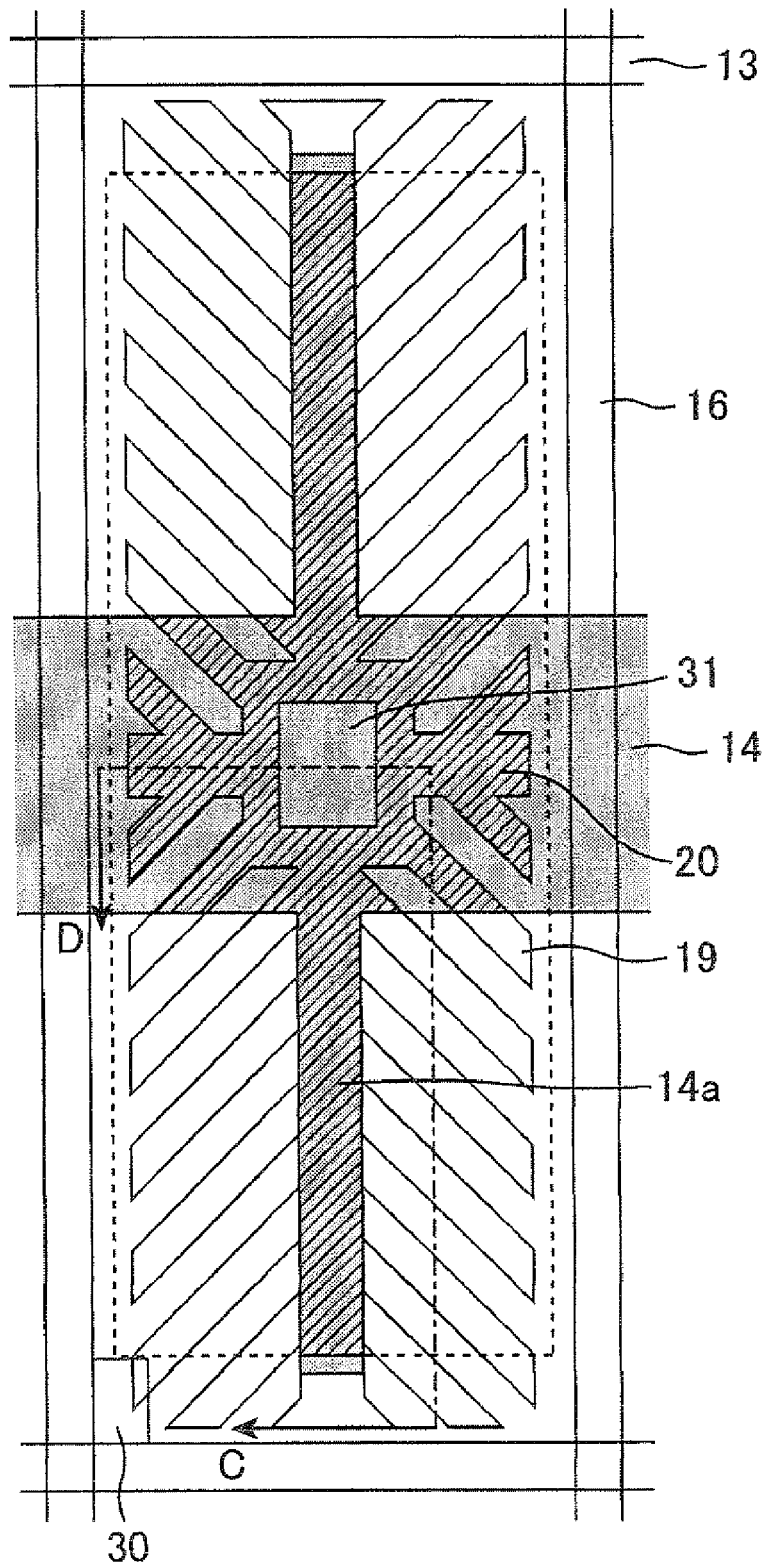
FIG. 6 is a plan view schematically showing a pixel of a liquid crystal display device in accordance with Embodiment 2.
Figure 7:
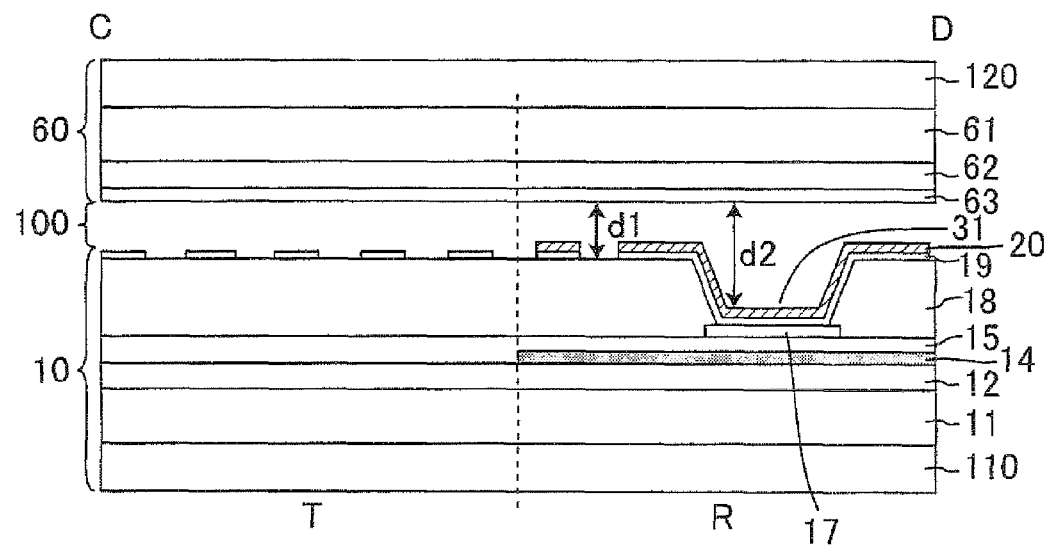
FIG. 7 is a schematic cross-sectional view taken along line C-D in FIG. 6.
Figure 8:
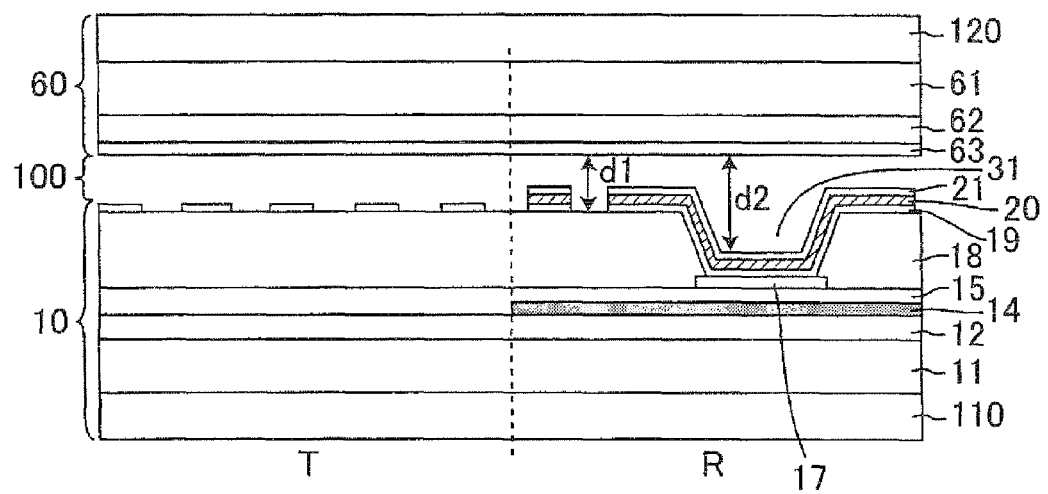
FIG. 8 is a cross-sectional view schematically showing a liquid crystal display device in accordance with Embodiment 3.
Figure 9:
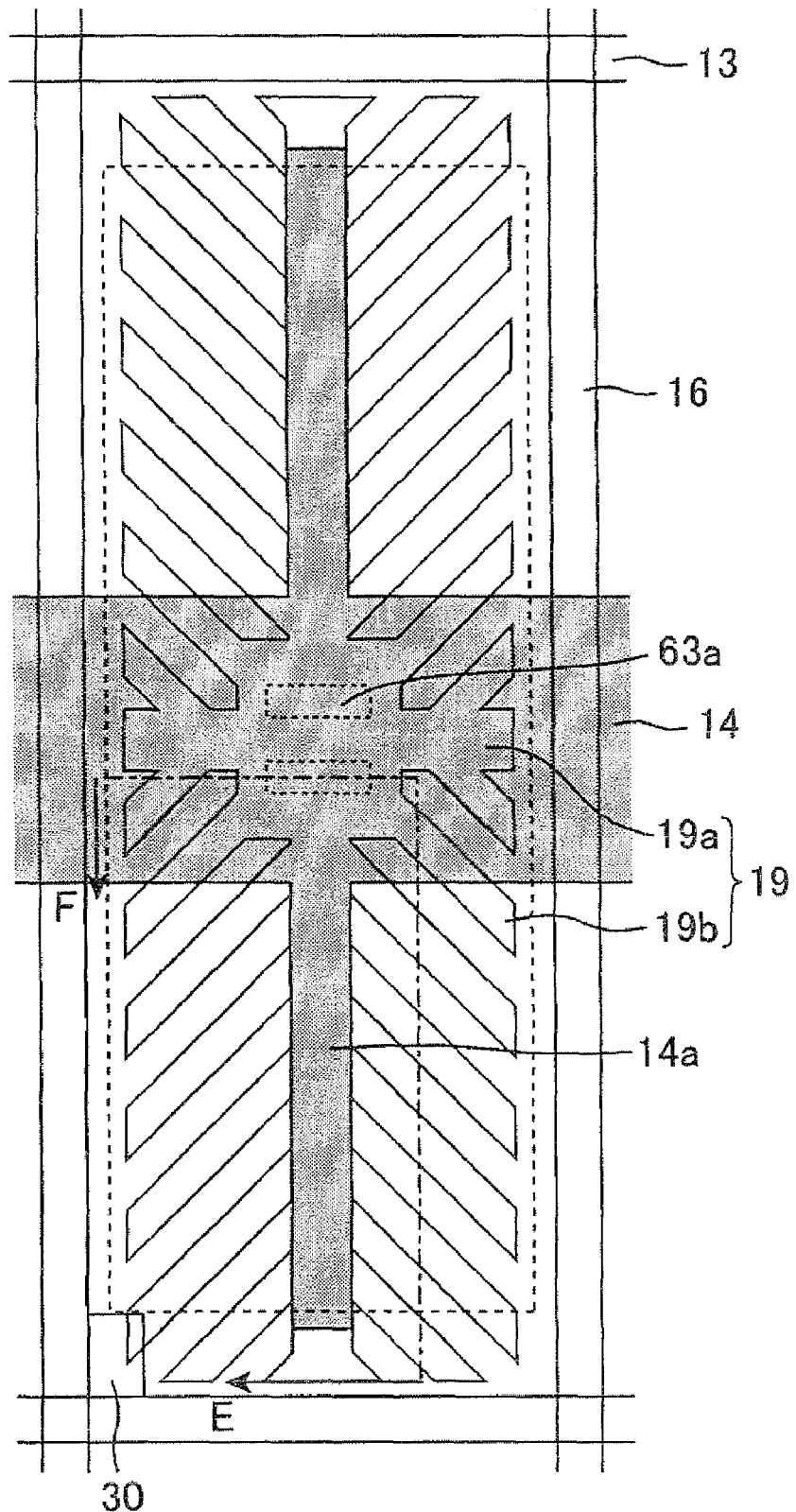
FIG. 9 is a plan view schematically showing a pixel of a liquid crystal display device in accordance with Embodiment 4.
Figure 10:
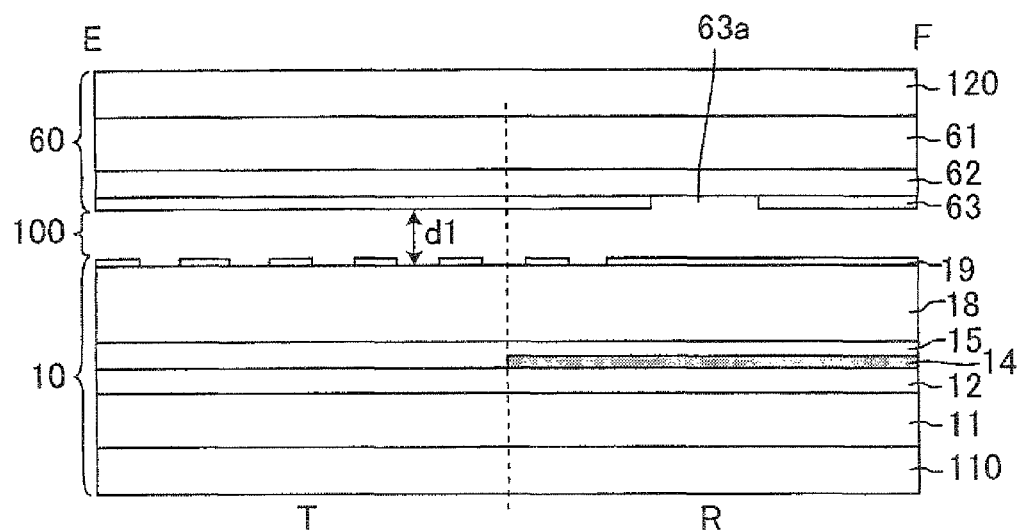
FIG. 10 is a schematic cross-sectional view taken along line E-F in FIG. 9.
Figure 11:
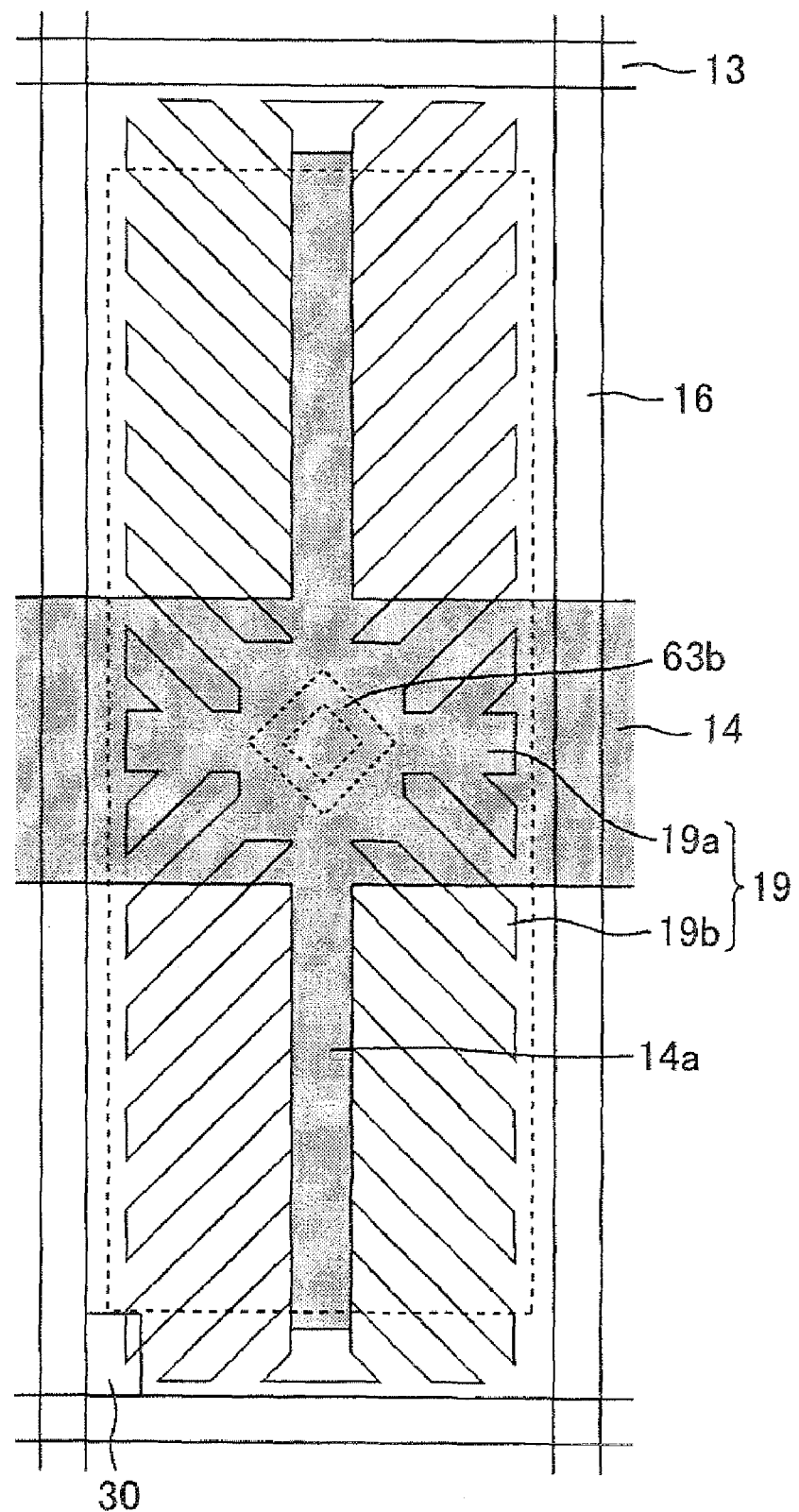
FIG. 11 is a plan view schematically showing another example of the aperture of the counter electrode of Embodiment 4.

10: Back-side substrate
11: Glass substrate
12: Base coat film
13: Gate signal line
14: Storage capacitor line
14a: Branched part of storage capacitor line
15: Gate insulating film
16: Source signal line
17: Drain electrode
18: Interlayer insulating film
19: Pixel electrode (ITO film)
19a: Trunk portion of pixel electrode
19b: Branch portion of pixel electrode
20: Al film 21: MoN film
30: Thin film transistor
31: Contact hole
60: Viewing-side substrate
61: Glass substrate
62: Color filter layer
63: Counter electrode
63a and 63b: Aperture
100: Liquid crystal layer
110 and 120: Circularly polarizing plate
R: Reflection region
T: Transmission region

The invention claimed is:

1. A liquid crystal display device, comprising:
a first substrate;
a liquid crystal layer; and
a second substrate in this order,
wherein the first substrate includes a pixel electrode having a trunk portion, a plurality of branch portions branched from the trunk portion, and slits,
the liquid crystal display device comprises a display region including a region where the branch portions and the slits are alternately arranged,
the display region includes a reflection region and a transmission region,
in the reflection region, the pixel electrode, a reflective film disposed under the pixel electrode, and a $\lambda/4$ retarder are arranged;
wherein the thickness of the liquid crystal layer in the reflection region is 60% or more of the thickness of the liquid crystal layer in the transmission region; and
wherein the proportion of the area occupied by the slit of the pixel electrode in the reflection region relative to the area of the entire reflection is 30% or more.

2. The liquid crystal display device according to claim 1, wherein the thickness of the liquid crystal layer in the reflection region is substantially identical to the thickness of the liquid crystal layer in the transmission region.

3. The liquid crystal display device according to claim 1, wherein the first substrate includes a polymer formed on a surface of the substrate by polymerizing a polymerizable component added in the liquid crystal layer while a voltage is applied to the liquid crystal layer,
the polymer having a surface structure for regulating a pretilt angle of liquid crystal molecules and/or an alignment direction of the liquid crystal molecules in the presence of an applied voltage.

4. The liquid crystal display device according to claim 1, wherein the liquid crystal layer includes liquid crystal molecules aligned in a direction vertical to the surface of the substrate in the absence of an applied voltage and aligned in a direction parallel to the surface of the substrate in the presence of an applied voltage.

5. The liquid crystal display device according to claim 1, wherein the reflective film is a storage capacitor bus line, a gate bus line, or a source bus line.

6. The liquid crystal display device according to claim 1, wherein the first substrate further includes, under the pixel electrode, a conductive part and an insulating film covering the conductive part, the insulating film having an aperture in the reflection region, the conductive part and the pixel electrode being electrically connected to each other at the aperture, the thickness of the liquid crystal layer in a region where the aperture is formed being larger than the thickness of the liquid crystal layer in the transmission region.

7. The liquid crystal display device according to claim 6, wherein the thickness of the liquid crystal layer in the region where the aperture is formed is 1.1 to 3.0 times as large as the thickness of the liquid crystal layer in the transmission region.

8. The liquid crystal display device according to claim 1, wherein the pixel electrode in the transmission region is formed of a transparent conductive material, and
the pixel electrode in the reflection region includes a reflective conductive film.

9. The liquid crystal display device according to claim 8, wherein the pixel electrode in the reflection region is a laminated body of a transparent conductive film and the reflective conductive film.

10. The liquid crystal display device according to claim 8, wherein the pixel electrode in the reflection region includes, in the uppermost layer of the pixel electrode, a film made of a material whose work function is different from that of the transparent conductive film in the transmission region by less than 0.3 eV, the uppermost layer facing the liquid crystal layer.

11. The liquid crystal display device according to claim 1, wherein the second substrate includes a common electrode in the reflection region, the common electrode being provided with a slit or an aperture.

12. The liquid crystal display device according to claim 11, wherein the sum of the area occupied by the slit in the pixel electrode relative to the area of the entire reflection region and the area occupied by the slit and the aperture in the common electrode relative to the area of the entire reflection region is 30% or more.

13. The liquid crystal display device according to claim 11, wherein the proportion of the area occupied by the slit and the aperture in the common electrode relative to the area of the entire reflection region is 30% or more.

14. The liquid crystal display device according to claim 1, wherein the width of the slit in the transmission region differs from the width of the slit in the reflection region.

15. The liquid crystal display device according to claim 14, wherein the width of the branch portion of the pixel electrode in the transmission region differs from the width of the branch portion of the pixel electrode in the reflection region.

16. A liquid crystal display device, comprising:
a first substrate;
a liquid crystal layer; and
a second substrate in this order,
wherein the first substrate includes a pixel electrode having a trunk portion, a plurality of branch portions branched from the trunk portion, and slits,
the liquid crystal display device comprises a display region including a region where the branch portions and the slits are alternately arranged,
the display region includes a reflection region and a transmission region,
in the reflection region, the pixel electrode, a reflective film disposed under the pixel electrode, and a $\lambda/4$ retarder are arranged; and
wherein the first substrate further includes, under the pixel electrode, a conductive part and an insulating film covering the conductive part, the insulating film having an aperture in the reflection region, the conductive part and the pixel electrode being electrically connected to each other at the aperture, the thickness of the liquid crystal layer in a region where the aperture is formed being larger than the thickness of the liquid crystal layer in the transmission region.

17. A liquid crystal display device, comprising:
a first substrate;
a liquid crystal layer; and
a second substrate in this order,
wherein the first substrate includes a pixel electrode having a trunk portion, a plurality of branch portions branched from the trunk portion, and slits,
the liquid crystal display device comprises a display region including a region where the branch portions and the slits are alternately arranged,
the display region includes a reflection region and a transmission region,
in the reflection region, the pixel electrode, a reflective film disposed under the pixel electrode, and a λ/4 retarder are arranged;
wherein the pixel electrode in the transmission region is formed of a transparent conductive material,
the pixel electrode in the reflection region includes a reflective conductive film, and
wherein the pixel electrode in the reflection region includes, in the uppermost layer of the pixel electrode, a film made of a material whose work function is different from that of the transparent conductive film in the transmission region by less than 0.3 eV, the uppermost layer facing the liquid crystal layer.

18. A liquid crystal display device, comprising:
a first substrate;
a liquid crystal layer; and
a second substrate in this order,
wherein the first substrate includes a pixel electrode having a trunk portion, a plurality of branch portions branched from the trunk portion, and slits,
the liquid crystal display device comprises a display region including a region where the branch portions and the slits are alternately arranged,
the display region includes a reflection region and a transmission region,
in the reflection region, the pixel electrode, a reflective film disposed under the pixel electrode, and a λ/4 retarder are arranged;
wherein the second substrate includes a common electrode in the reflection region, the common electrode being provided with a slit or an aperture; and
wherein the sum of the area occupied by the slit in the pixel electrode relative to the area of the entire reflection region and the area occupied by the slit and the aperture in the common electrode relative to the area of the entire reflection region is 30% or more.

19. A liquid crystal display device, comprising:
a first substrate;
a liquid crystal layer; and
a second substrate in this order,
wherein the first substrate includes a pixel electrode having a trunk portion, a plurality of branch portions branched from the trunk portion, and slits,
the liquid crystal display device comprises a display region including a region where the branch portions and the slits are alternately arranged,
the display region includes a reflection region and a transmission region,
in the reflection region, the pixel electrode, a reflective film disposed under the pixel electrode, and a λ/4 retarder are arranged;
wherein the second substrate includes a common electrode in the reflection region, the common electrode being provided with a slit or an aperture; and
wherein the proportion of the area occupied by the slit and the aperture in the common electrode relative to the area of the entire reflection region is 30% or more.

20. A liquid crystal display device, comprising:
a first substrate;
a liquid crystal layer; and
a second substrate in this order,
wherein the first substrate includes a pixel electrode having a trunk portion, a plurality of branch portions branched from the trunk portion, and slits,
the liquid crystal display device comprises a display region including a region where the branch portions and the slits are alternately arranged,
the display region includes a reflection region and a transmission region,
in the reflection region, the pixel electrode, a reflective film disposed under the pixel electrode, and a λ/4 retarder are arranged; and
wherein the width of the slit in the transmission region differs from the width of the slit in the reflection region.

* * * * *